United States Patent [19]

Heinze et al.

[11] 4,110,764
[45] Aug. 29, 1978

[54] CAMERA SHUTTER

[76] Inventors: Martin Heinze, 5 Rütger-Von-Scheven, Duren; Walter Heinze, 14 Gruner Weg, Hürtgenwald-Gey, both of Germany

[21] Appl. No.: 753,515

[22] Filed: Dec. 22, 1976

[30] Foreign Application Priority Data

Dec. 22, 1975 [DE] Fed. Rep. of Germany ....... 2557885

[51] Int. Cl.$^2$ ........................... G03B 7/08; G03B 9/22
[52] U.S. Cl. ...................................... 354/51; 354/234; 354/264
[58] Field of Search ................. 354/230, 234, 264, 38, 354/51

[56] References Cited

U.S. PATENT DOCUMENTS

| 2,953,983 | 9/1960 | Larson | 354/234 X |
| 3,199,428 | 8/1965 | Kiper | 354/230 |

*Primary Examiner*—L. T. Hix
*Assistant Examiner*—M. L. Gellner
*Attorney, Agent, or Firm*—Norman S. Blodgett; Gerry A. Blodgett

[57] ABSTRACT

Camera shutter having at least two hinged iris leaves, each leaf having a control lever, a push rod joining the control levers, a magnetic actuator operating on the push rod.

15 Claims, 4 Drawing Figures

CAMERA SHUTTER

BACKGROUND OF THE INVENTION

The present invention concerns itself with an elecromagnetically operated central shutter mechanism for use in photographic cameras, wherein closure lamellae which overlap each other in a primary position, each being equipped with a pin arranged perpendicularly to its plane, the lamellae are swingable from the rays of the lens and are equipped with control levers to engage control devices. Such central shutters are necessary for photographic cameras to make exact reproductions within limits and with little operational service, to expose light sensitive material, or to allow rays for a lens to a measuring search system, such as a mirror reflex system. Conventional central shutter systems are made for relatively short exposure time, whereby with a large opening diameter, the minimum opening time is also extended. These common mechanically-operated central shutters require for each release a previous mechanical tension of the release knob. To achieve simple release and tension operation through electrical cables, even over a long distance, central shutters are equipped with electro-magnets to act on the release mechanism. In addition, closure mechanisms are known which use motors for tension of the shutters and for adjustment to obtain a desired diaphragm opening. By electronic control of the shutter time, a slow shutter speed can be achieved without the use of the common mechanical stop mechanisms. Practical camera shutters, however, achieve closure times of only 1/60 sec. and the control display is so big that a special and expensive control device is needed. Also, magnetically-operated shutters are on the market which, however, use a considerable power (for example, 75 watt), so that they are attached to the electrical outlet or driven by large, heavy lead or Edison batteries. Also, in that case the shortest practical shutter speed is not satisfactory. Small shutter openings may achieve a shutter speed of 1/125 sec. The large cameras used by industry etc. achieve a value of only 1/30 sec., which is generally not sufficient.

It is the object of the present invention to provide an electro-magnetically operating shutter of the above-described type, which with low power consumption can achieve a large number of release operations from a relatively small battery; which has small power output and also a small inertia, so that short closure shutter times are safely achieved.

Another object of the invention is the provision of a camera shutter whose control switch takes up little space, so that the shutter mechanism can be used as special closure, is practically independent of electrical outlets, and may be also used as a stationary addition to the cameras.

SUMMARY OF THE INVENTION

The objects of the invention are met by pusher rods used which engage with vertically-arranged carrier elements, two control levers of two shutter lamellae forming together a parallel drive. Other carrier elements engage the free end of a magnetically-operated adjusting lever whose magnet are electrically charged for opening the diaphragm with a first voltage which will be lowered after a short time (for the remaining time of the total closure time) to a holding voltage. By the use of only a few distinct parts, which are extremely easy to fabricate, a small inertia of the moving parts of the shutter is obtained which additionally is increased by a known electro-magnet with movable element as used in relay techniques.

DESCRIPTION OF THE PREFERRED EMBODIMENT

Figure 1:
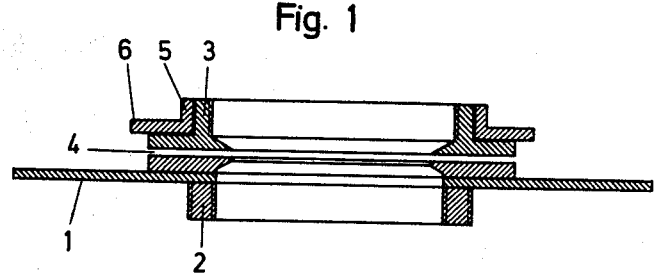
FIG. 1 is a sectional view of the support portion of the shutter.

FIG. 1 shows the important parts of the shutter support in axial cross-section. A lens carrier 1 is equipped with a connecting thread. Its flange towards the front direction forms an intermediate space 4, with a stud bolt 2 for the lens front member, in the closure plane and in which shutter lamellae are guided. The shutter is also equipped with a shutter ring 5 which is equipped with a curvature disc 6 for controlling the shutter valves.

Figure 2:
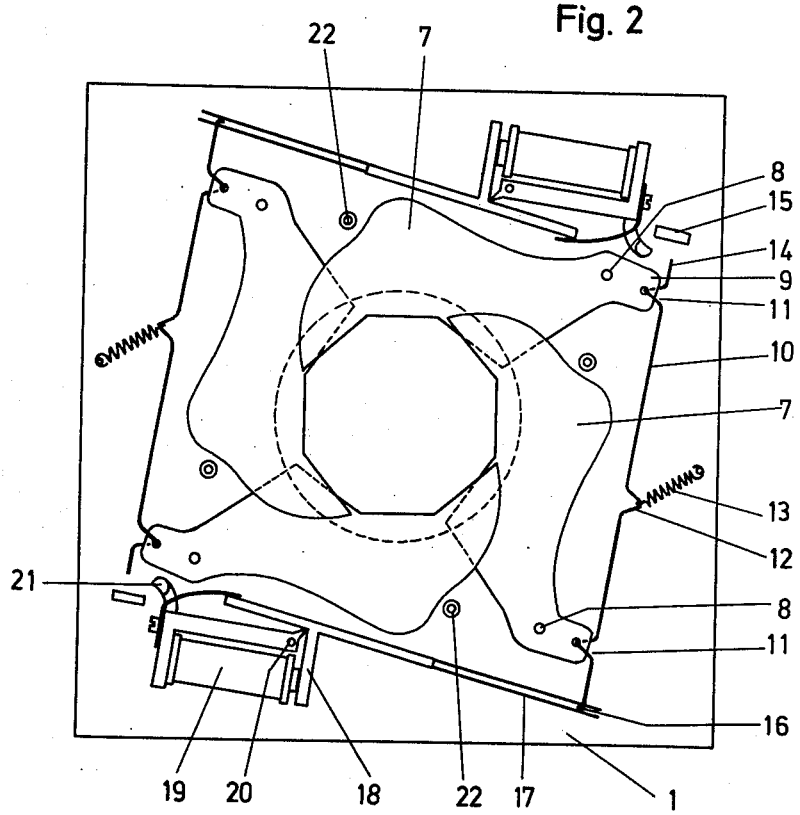
FIG. 2 is a vertical elevational view of the lens carrier after the removal of cover plates and stud bolt.

FIG. 2 is a front elevational view of the lens carrier 1 after removal of the stud bolt 3 and shutter ring 5, so that shutter lamellae 7 and the operating mechanism are clearly shown. The shutter is shown in the maximum opening position of the shutter lamellae 7. Each of the four lamellae 7 is swingable about on pivot pin 8. A conrol lever 9 extends past the pivot pins of each pair of lamellae 7 and are penetrated by offsets 11 from a pusher rod 10 made of steel wire. The length of the offsets is adjusted to the pivot pin of the lamella pair, and the control lever of each lamella pair are lined up in such a way that they form the sides of a paralellogram. To a side offset 12 is attached a spring 13, which places the shutter in tension in its "closed" position and biases the pusher rod 10 in the direction of a stop 15. In the closed position a free end 14 of pusher rod 10 is positioned against the stop 15. A bent opposite end piece 16 of the pusher rod 10 engages a spring fork 17 which engages a piece of flat material positioned on edge and, consequently, engages with considerable resistance a relay-type movable element 18 at the end of a magnet 19. The magnet 19 has pins 20 in the area where the movable element is supported by a knife edge, so that the magnet 19 is supported somewhat swingably. An operator cam 21 mounted on the end of the magnet 19 and is pressed with a spring (not shown) against the curved disc 6 (not shown in this figure) of the shutter ring 5. As shown in this figure, a second pair of the shutter lamellae 7 is provided with the same operating devices.

For opening the shutter, the magnet 19 is magnetized for a short time, for example, in this design example for two milliseconds with a current of 70 volt holding current for the exposure time. In that way by the action of self-induction, the magnet 19 in series with resistors is pulled up to the core of magnet 19. This is achieved so that with the start of the magnetizing of the elements 18 up to the rest position against an element, such as a brass rivet head, which prevents magnetic sticking. With swinging of the element through a short path, increased by the long lever arm of the spring fork, the push rod 10 will be pulled from the stop 15 against the action of spring 13 into the shown position. The control lever 9 pulls the shutter lamellae 7 into the "open" position as shown. With the switchoff of the magnet 19, the springs engaging the anchors, as well as the holding springs 13, pull back the anchor, spring fork, pusher rod, and the two attached lamellae into the "closed" normal position. The same procedure is accomplished with the two remaining shutter lamellae 7 operating as a parallel drive system.

This short period (less than two milliseconds) of magnetizing, may also bring about a correspondingly short opening time of the shutter. It has been proven to be of advantage to lower the masses that need to be accelerated, i.e., the moment of resistance, to a minimum. It has also been proven to be of advantage the fact that the push rods 10 result in the smallest friction loss by the use of the scissor principle. The push rods penetrate the control levers with offsets, so that supports of the scissor type are created. The offset 12 is shaped in such a way that the force component exerted by the spring 13 acts vertically on the push rod and directs it in such a way that it does not need a special guide. The relatively stiff design of the spring fork 17 assures the transfer of a predetermined stroke; the low elasticity, however, prevents vibration of the shutter lamellae. Just as important, however, is the fact that it has been shown that the swing angle of the shutter lamellae in the closed, final position is fixed and limited by the push rods 10 contacting the stop 15; in open position, the anchor elements 18 of the magnets 19 lie against its polar face. By swinging the magnets 19 around the pins 20, the end position of the shutter lamellae 7 can be adjusted into the open position. The adjustment is made by the curve movement of the curve disc 6 of the shutter ring 5 pressing the scanning cam 21 during the turning of the shutter ring, the movement corresponding to the slope of the curve as to being lifted or lowered. The closure shaped in accordance with this invention, therefore, does not need a special shutter. By operating the shutter ring, the adjustment is always made for the amount the shutter lamellae 7 are to be opened and which shutter value is needed corresponding to the light inlet opening. Fastening bolts 22 serve mainly to accept the stud bolt 3 for the lens front members, as well as for the corresponding cover. They may be used for limiting the swing angle of the shutter lamellae 7 during mounting.

Figure 3:
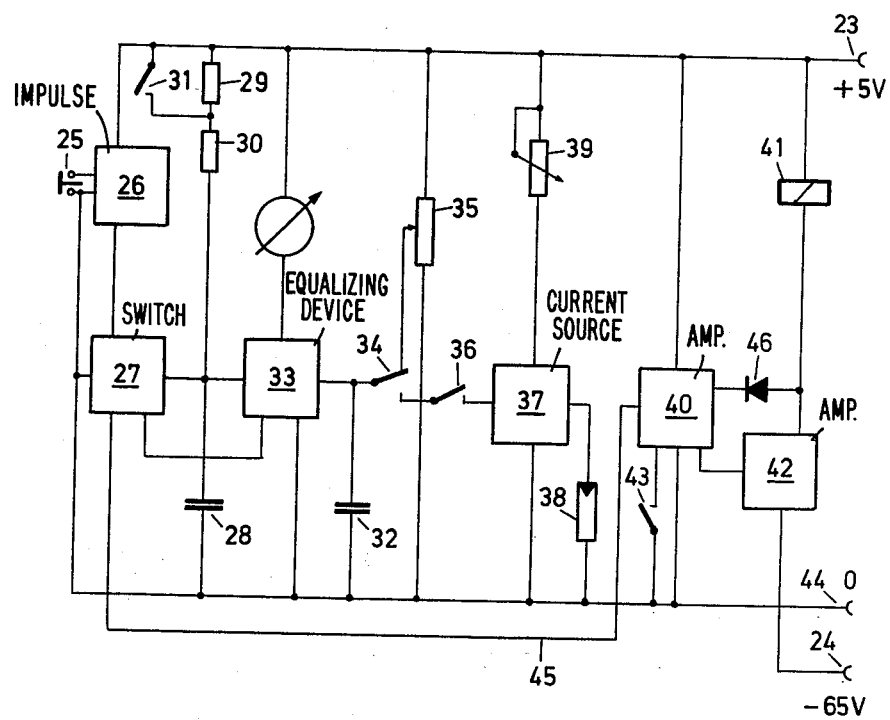
FIG. 3 is a schematic diagram of the electro-magnetic control device for the shutter.

FIG. 3 shows a schematic block diagram of a device for the control of the camera shutter in accordance with FIGS. 1 and 2. The arrangement that is shown is fed by a commercial mercury battery of 5.6 volts which is attached to the binding post 23 and which is effective between this post and post 44. A transformer fed by the same battery supplies a post 24 with a negative current of 65 volt. For operating the shutter, a release button 25 in the shape of a key is pressed which connects the entrance of the impulse 26 with the main circuit 44. The impulse has available an equalizing R-C member through a multiple-contact release, as will as a mono-stable time switch, with which selectively common single releases, or a predetermined sequence of releases, (also adjustably selective), in differences of 0.1 to 0.3 sec. is energized.

For each release, the switch step 27 receives an impulse which is intended to open the shutter through circuit 45 and serves to feed a control impulse to the magnet amplifier 40 and at the same time releases the time capacitor 28 which has been kept closed by the control impulse until now, for charging through the loading resistors 29 and 30. By means of the time switch 31, the loading resistor 29 may be short-circuited for a short time for switch-over.

The exposure time is determined in comparison to the voltage of the control capacitor. The control capacitor 32 and the timing capacitor 28 are attached to a matching or equalizing device 33 which becomes active upon the opening of the shutter. Upon voltage equality 28 and 32, the capacitors of the switch 27 introduces a control impulse, which interrupts the opening impulse (activated through circuit 45) and so closes the shutter.

The controlled voltage on the control capacitor 32 and the exposure time is given in the shown "manual" position of the switch 34 by the manually-adjustable potentiometer 35, taken from the battery voltage as partial voltage, and this control voltage determines the exposure time, readable from a measuring instrument previously connected to the equalization device 33 which can be calibrated as its exposure time.

In order to execute automatic measuring, the switch 34 is operated and the storage swich 36 is closed, so that the control capacitor 32 is loaded from the constant-current source 37 which again feeds the photo-resistor 38. The corresponding film sensitivity can be adjusted by the constant current-determining potentiometer 39 which is connected to the constant current source 37. The current reduction (appearing on the photo-resistor 38 by means of constant current) is carried over to the control capacitor 32. The photo-resistor may be directed to the object through special optical elements with a pre-determined angle of measurement, but it may also be arranged for the execution of an inside measuring behind the lens of a camera. Especially with single relfex cameras, it is important that, before the closure of the shutter, the swingout of the reflector of the storage switch 36 be opened up. The control capacitor 32 stores the voltage which was last fed before the opening of the storage switch, independently from the next shading of the photo-resistor 38.

The control of the magnets 19 of FIG. 2 by activating the coils 41 with current originating in magnet amplifiers 40 in connection with the impulse amplifier 42. The negative control impulse is fed to the magnet amplifier 40 from the switch step 27 through circuit 45, where its front activates the opening and its rear flank activates the closure of the shutter. For a longer exposure, as well as during the focusing of the photographic object with a single reflex camera, the switch 43, or a number of parallel-arranged switches, is closed, which releases the same action as the impulse fed over circuit 45.

With the introduction of the front flank of the control impulse, corresponding to the closure of switch 43, the magnet amplifier 40 closes a circuit from the battery attached to the contact 23 through the coils 41 of the shutter and the magnet amplifier to the main circuit 44. At the same time, the control impulse will be transferrred to the impulse amplifier 42 which contains a mono-stable switch step and, in this design example, presents a voltage of 65 volts on contact 24 through the spools 41 for two milliseconds, so that for this short time the total voltage of 70-volts magnetizes intensively the magnet 19 of FIG. 2. A diversion of the voltage flow is prevented by the impulse amplifier 42 through the magnet amplifier 40 to the main circuit 44 by the diode 46 arranged ahead of the magnet amplifier.

Figure 4:
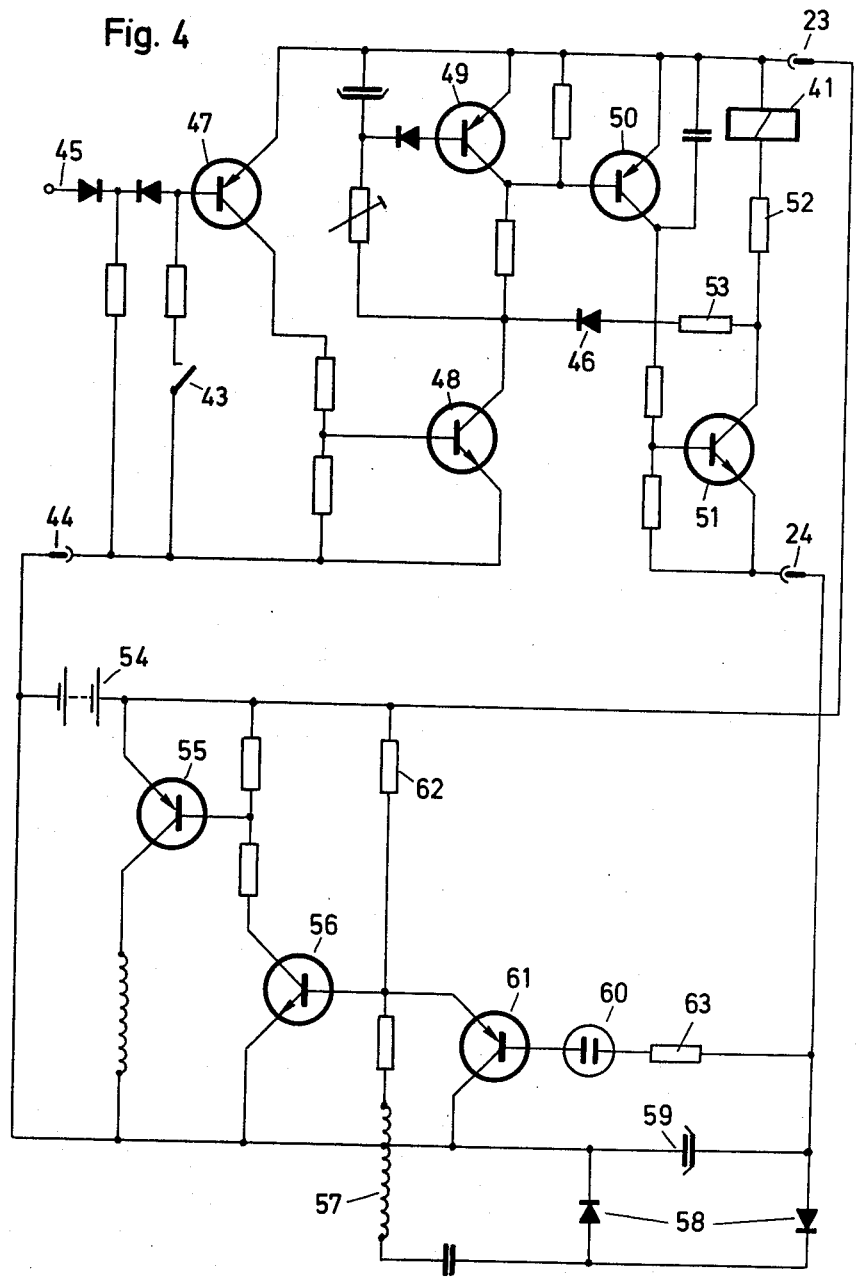
FIG. 4 is a schematic diagram of the magnet amplifier of FIG. 3, serving to feed the magnets of the shutter of FIG. 2 with a corresponding current supply.

Individually, the function of the magnet amplifier 40 with the impulse amplifier 42 in connection with the device acting on the higher voltage, is explained by FIG. 4. In the normal position, that is to say, with a closed shutter, a positive potential is fed from the switch 27 through the circuit 45 to diodes positioned on the bases of the transistor 47, so that the PNP transistor 47 as well as the transistors 48 to 51 are closed. During the operation of the switch 43 or the introduction of a negative pulse to the zero-potential-reaching impulse over the circuit 45, the transistor 45 receives current and also closes the transistor 48, thus acting as a switch amplifier, so that through the diode 46 and resistors 52 and 53, the battery voltage is impressed on the coils 41. The transistor 48 closes at the same time as the transistor 50, which again closes transistor 51. With it the higher voltage of 65 volt in series with the battery voltage and the by-passing of resistance 53 (for fast energizing over a short time) switches to the coil 41. After loading of the capacitors of the R-C member positioned on the base of transistor 49, retarded for about 2 millisecond, the transistor 49 closes, which opens the transistors 50 and 51, so that the increased magnetizing of magnets 19 is switched off and they are now only activated by the holding current.

After the end of the negative impulse through circuit 45 and with it, after increase of the voltage in the transistors 47 (which is increasing again after the opening of the swtich 43) the transistor 47 is closed, which also closes the transistors 48, 49, so that the coils 41 lose their current and all transistors of the magnet and impulse amplifiers are without current. Under the influence of the holding springs 13 of FIG. 2, the shutter lamellae 7 are pulled back into their starting positions.

It has proven to be of advantage that, during the time the shutter is closed, none of the transistors 47 to 51 receives current from the battery, so that the magnetization remains relatively low and the holding current is extremely low, so that the feeding battery 54 is under relatively little load. To obtain this effect, the transformer is of great help, as shown in FIG. 4. The transistors 55 and 56 act as a block oscillator and the voltage, which is on the higher voltage coil 57 with the coil, loads the loading condenser 59 to 65 volt through the capacitive-coupled rectifier arrangement. When the pre-determined voltage is achieved, then the glow lamp 60, with close glow tolerance goes on and closes the trnsistor 61, so that the oscillation of the transistors 55, 56 is interrupted and, consequently, they are closed. In that way the first loading of the condenser 59 can be made within 5 seconds with a maximum current of 50 mA (milli amperes) and, after loading is completed and ignition of the glow lamp takes place, the transistor 61 receives only about ⅓ of a milliamp. through the resistance 62. Because of the high resistance 63 of the glow lamp 61, there is practically no loading, so that the voltage by periodic after-loading, which is always short, for example 0.2 sec., is kept up, even after a series of releases of 2 to 3 seconds to again activate the glow lamp 60. By such small current consumption, a small 1-Ah battery permits several thousand shutter releases and no outlets, lead collectors, or the like have to be used.

The other switch units, as far as they are concerned with time measurements in comparison to the potential current difference on the condenser of FIG. 2 of DT-OS 2364914, may be taken in the same way as the light-metering by feeding a photo-resistor through the constant current source. The impulse 26 and also the switch 27 assure that, mainly by alternating use of NPN and PNP transistors in the base condition, most of the transistors are closed, so that the normal current use remains very small.

The shutter may be varied within the scope of this invention. The push rods 10 or the number of shutter lamellae or their shape may be varied. However, it has been found that push rods made from steel wire have a desirable small mass, and that four lamellae are sufficient. A larger number would increase the fabrication and control expenditure considerably. The contours of the lamellae are purposely selected in such a way that, with an open shutter, the opening takes roughly the shape of a circle. By using a corresponding angle or U-shaped contour, the opening may achieve the shape of an equilateral "2n" polygonal shape, wherein the letter "$n$" equals the number of the lamellae 7. Also, the means necessary to prevent sticking of the movable elements 18 on the core of the magnetized magnet 19 may be restricted, or eliminated. Such a magnetic sticking can be of advantage in lowering the necessary holding magnitization and a reflection in a reduction of current use. The duration of magnetizing can be selected differently, since it does not directly determine the shortest exposure time by its lasting effect. With different delays, during opening and (for example, with a 3 m sec. (millisecond) impulse) an exposure of 1/500 sec. can be achieved. Also, the instrument arranged in front of the comparison device may be changed or eliminated. A sensible indicator may be achieved by using illuminating diodes. They can indicated individual exposure values and also an in-line arrangement. One or several diodes light up at sub-critical short exposure times; a longer row or a determined corresponding working point indicates that danger of movement is present.

With this invention, a shutter has been created, whose mechanical parts are simply designed, and have very small inertia, so that, with an average control, output shutter speeds of 1/500 sec. are achieved. The simple mechanical design also leads to the benefit that, with an average cost, a control device has been created which occupies only a small space and a small rest current and where also the current supplying battery can be incorporated into small cameras. The control device may be further expanded with little expenditure, so that multi-exposures and a series of short, periodical exposures at small time intervals are possible, so that photographic cameras having this type of shutter can be used for time-measurement as well as for photographing of art objects, and with simple cameras, relatively complicated movement studies are made possible.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Electro-mechanically operated control shutter for photographic cameras including a lens and comprising:
 (a) at least two shutter lamellae, each lamellae including a shutter portion and a lever portion and being pivotally mounted intermediate said shutter portion and said lever portion, so that said lamellae are swingable in parallel planes for occupying a primary position, wherein such shutter portions overlap each other to block light rays from the lens and occupy an open position wherein said shutter portions move out of the light rays from the lens to define an opening, (b) means for biasing said lamellae in to said closed position, (c) at least two pusher rods, each respectively connected at one of their ends to respective lever portions of said lamellae, (d) a pivoted adjusting lever for each of said pusher rods, one end of each lever being operatively connected to the other end of its corresponding pusher rod, (e) an electro-magnet for each adjusting lever for controlling the opposite end thereof, wherein said lamellae is moved to said open position in opposition to said biasing means upon energization of said electro-magnet, and (f) electrical control means for energizing said electro-magnets for a predetermined time period whereby said lamellae maintain their open position during said time period.

2. Shutter as recited in claim 1, wherein said electrical control means are effective for energizing said electro-magnets so that a relatively high voltage is applied to said electro-magnets for bringing said lamellae to said open position followed by a lower holding voltage for the remainder of said time period.

3. The electro-mechanically operated control shutter as recited in claim 2, wherein said electrical control means comprises;

(a) a battery for providing said low voltage to said electro-magnets, (b) a transformer connected to said battery for providing said high voltage to said electro-magnets, and (c) switching means for selectively connecting said electro-magnets to said battery voltage or said transformer voltage.

4. The electro-mechanically operated control shutter as recited in claim 3, wherein said switching means comprises:

(a) a control capacitor, (b) a timing capacitor, having a predetermined loading current, and (c) an equalizing device connected to said timing and control capacitors for determining current equality between said control capacitor and said time capacitor whereupon it is effective to release an electrical switching signal.

5. The electro-mechanically operated control shutter as recited in claim 4, wherein said control capacitor is adjustably loaded.

6. The electro-mechanically operated control shutter as recited in claim 4, wherein said switch means comprises:

(a) a photo-resistor having a loading current which is determined by exposure to light, (b) a constant current source connected to said photo-resistor and said control capacitor for determining current equality, and (c) switch means selectively connecting said photo-resistor to said control capacitor.

7. The electro-mechanically operated control shutter as recited in claim 6, wherein said constant source is adjustable.

8. Shutter as recited in claim 1, wherein the ends of said adjusting levers which are controlled by said electro-magnets have a substantially shorter stroke than the ends which are connected to said pusher rods.

9. Shutter as recited in claim 1, wherein the ends of said adjusting levers which are controlled by said electro-magnets are bifurcated wherein each of said bifurcations diverge and each of said electro-magnets comprises a knife edge which extends into the interior vertex of the birfurcation of its corresponding lever for pivoting same.

10. The electro-mechanically operated control shutter as recited in claim 9, wherein said electro-magnets are adjustably mounted for varying the open position of said lamellae.

11. The electro-mechanically operated control shutter as recited in claim 1, wherein each of said pusher rods includes an offset portion and said biasing means includes a tension spring connected to said offset position.

12. The electro-mechanically operated control shutter as recited in claim 11, wherein said shutter comprises stops and said pusher rods comprises extending portions which are urged toward said stops by said biasing means for engagement with said stops.

13. The electro-mechanically operated control shutter as recited in claim 1, wherein there is a pair of lamellae connected to each of said pusher rods.

14. The electro-mechanically operated control shutter as recited in claim 1, wherein said each of said lamellae has at least two straight edge portions adjacent said shutter opening for forming a regular polygon having twice as many sides as there are lamellae when said lamellae are in said opening position.

15. The electro-mechanically operated control shutter as recited in claim 14, wherein the two straight edge portions of each lamellae form an angle of approximately 135°.

* * * * *